Patented Aug. 1, 1950

2,516,945

UNITED STATES PATENT OFFICE 2,516,945

HEAT STABILIZED POLYMERIC 2,3-DI-CHLORO-1,3-BUTADIENE AND PROCESS FOR OBTAINING SAME

Arthur L. Barney, Wilmington, Del., assignor to E. I. du Pont de Nemours & Company, Wilmington, Del., a corporation of Delaware No Drawing. Application March 31, 1948, Serial No. 18,290

5 Claims. (Cl. 260—45.9)

This invention relates to polymers of 2,3-dichloro-1,3-butadiene having improved heat stability and to a method of obtaining these heat-stable polymers.

The polymers of 2,3-dichloro-1,3-butadiene are described in U. S. Patent 1,965,369. They are of considerable practical interest, for example as freeze-reducing agents in polychloroprene. More recently it has been found (application S. N. 718,618, filed by A. L. Barney on December 26, 1946) that films, filaments and the like of polymerized 2,3-dichloro-1,3-butadiene can be cold drawn to permanently elongated structures of great strength showing a characteristic orientation diagram when examined by X-ray diffraction methods. However, the value of these applications of 2,3-dichloro-1,3-butadiene polymers is impaired by the fact that these polymers are susceptible to a high degree of deterioration by heat. Exposure of the polymers to a high temperature, for example 150° C., for as little as two hours, produces discoloration and embrittlement; the same kind of deterioration occurs at lower temperatures, such as can be commonly encountered in practice, on more prolonged exposure.

This invention has as an object a composition of matter comprising heat stabilized polymer of 2,3-dichloro-1,3-butadiene. A further object is an effective and economical method for preventing or for materially reducing the deterioration to which polymeric 2,3-dichloro-1,3-butadiene is normally subject. Other objects will appear hereinafter.

I have now found that polymers of 2,3-dichloro-1,3-butadiene containing intimately mixed therewith a minor amount by weight of an ester of an N,N-dialkyldithiocarbamic acid are effectively stabilized against heat deterioration. Preferably, the stabilizer is an N,N-dialkyldithiocarbamic ester of a primary alcohol having no substituent other than the alcoholic hydroxyl. The best results are obtained with bis N,N-dialkyldithiocarbamates of dihydric primary alcohols having no substituent other than the alcoholic hydroxyls.

The dithiocarbamates for use in this invention may be prepared by methods described in the literature. The bis dithiocarbamates of dihydric alcohols may be prepared as described in U. S. Patent 2,384,577.

In the tests tabulated below, each stabilizer was incorporated at 2% concentration into a 2,3-dichloro-1,3-butadiene polymer by dissolving the polymer and 2% by weight of the stabilizer in xylene at about 100° C. The resultant solution was poured on a casting plate at 85° C. and the plate temperature gradually raised to 130° C. until the solvent was evaporated. The film was then cooled quickly to room temperature, removed from the plate and placed in an oven at 150° C. in which air was circulating, together with a similar but untreated film of poly-2,3-dichloro-1,3-butadiene for comparison. The films were examined at intervals for color and embrittlement, if any.

The following dithiocarbamates were used in these tests:

A.  1,10-decamethylene bis dimethyl $(CH_3)_2N-\underset{\underset{S}{\|}}{C}-S-(CH_2)_{10}-S-\underset{\underset{S}{\|}}{C}-N(CH_3)_2$ B.  1,6-hexamethylene bis dimethyl $(CH_3)_2N-\underset{\underset{S}{\|}}{C}-S-(CH_2)_6-S-\underset{\underset{S}{\|}}{C}-N(CH_3)_2$ C.  1,3-trimethylene bis dimethyl $(CH_3)_2N-\underset{\underset{S}{\|}}{C}-S-(CH_2)_3-S-\underset{\underset{S}{\|}}{C}-N(CH_3)_2$ D.  Methylene bis dimethyl $(CH_3)_2N-\underset{\underset{S}{\|}}{C}-S-CH_2-S-\underset{\underset{S}{\|}}{C}-N(CH_3)_2$ E.  1,2-ethylene bis dimethyl $(CH_3)_2N-\underset{\underset{S}{\|}}{C}-S-(CH_2)_2-S-\underset{\underset{S}{\|}}{C}-N(CH_3)_2$ F.  Methylene bis diethyl $(C_2H_5)_2N-\underset{\underset{S}{\|}}{C}-S-CH_2-S-\underset{\underset{S}{\|}}{C}-N(C_2H_5)_2$ G.  Ethylidene bis dimethyl $(CH_3)_2N-\underset{\underset{S}{\|}}{C}-S-\underset{\underset{CH_3}{|}}{CH}-S-\underset{\underset{S}{\|}}{C}-N(CH_3)_2$ H.  Allyl dimethyl $(CH_3)_2N-\underset{\underset{S}{\|}}{C}-S-CH_2-CH=CH_2$ I.  2,4-dinitrophenyl dimethyl $(CH_3)_2N-\underset{\underset{S}{\|}}{C}-S-\underset{NO_2}{\underset{|}{\bigcirc}}-NO_2$ J.  2-butene-1,4 bis di-n-butyl $(C_4H_9)_2N-\underset{\underset{S}{\|}}{C}-S-CH_2-CH=CH-CH_2-S-\underset{\underset{S}{\|}}{C}-N(C_4H_9)_2$ K.  Dodecyl di-n-butyl

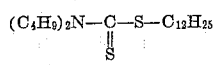

L.  Xylylene bis di-n-butyl

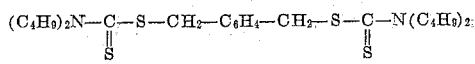

M.  1,6-hexamethylene bis di-n-butyl

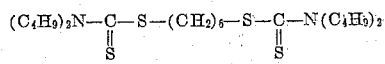

N.  1,10-decamethylene bis di-n-butyl

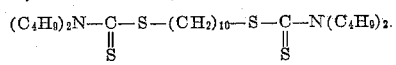

O.  2-butene-1,4 bis dimethyl

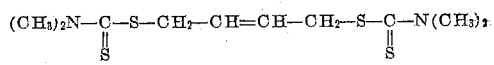

The dithiocarbamate indicated at L above is a mixture of the ortho, meta and para compounds.

The results of the examination after 4, 6, 8 and 24 hours at 150° C. of films stabilized with the above-listed dithiocarbamates are indicated in the following table:

| Dithiocarbamate | Aspect of film after storage at 150° C. for— | | | |
|---|---|---|---|---|
| | 4 hours | 6 hours | 8 hours | 24 hours |
| None (control) | Yellow, brittle | Brown, brittle | Dark brown | Too brittle to handle. |
| A | No change | No change | No change | No color, good cold draw. |
| B | do | do | do | Yellow, slightly brittle. |
| C | do | V. sl. yellow | Sl. yellow | Brown, slightly brittle. |
| D | do | do | do | Do. |
| E | do | Sl. yellow | Yellow | Do. |
| F | do | Yellow | do | Do. |
| G | do | Sl. yellow | Sl. yellow | Do. |
| H | do | Yellow | Yellow | Do. |
| I | Sl. yellow | Sl. yellow | Sl. yellow | Do. |
| J | No change | V. sl. dark | Sl. dark | Do. |
| K | do | V. sl. yellow | Sl. yellow | Do. |
| L | do | No change | No change | V. sl. yellow, good cold draw. |
| M | do | do | do | Do. |
| N | do | do | do | Do. |
| O | do | do | do | Yellow, v. sl. brittle. |

The film indicated at I in the table was slightly yellow at the start, because of the color of 2,4-dinitrophenyl N,N-dimethyldithiocarbamate.

It will be observed from the above table that all of the films containing a dithiocarbamate showed considerable improvement over the control film from the standpoint of both embrittlement and development of color. The control was yellow even after only two hours in the oven at 150° C. and, after 24 hours, it had lost all utility as an industrial material. The films containing a dithiocarbamate, on the other hand, showed only slight embrittlement after 24 hours in this accelerated test and, in the most favorable cases, were as amenable to cold drawing after 24 hours at 150° C. as they were at the start of the test. The stabilized samples were less discolored after 24 hours than the control after 4 hours and, in the best cases, showed no yellowing or a very slight one.

In addition to the stabilizers mentioned above, others may be used such as the N,N-dipropyl, dihexyl, dioctyl, didodecyl etc.—dithiocarbamic acid esters of methanol, ethanol, butanol, hexyl alcohol, stearyl alcohol, phenol, methoxyethanol, ethoxyethanol, tetramethylene glycol, octamethylene glycol, tetradecamethylene glycol, octadecamethylene glycol, dihydroxydiethyl ether, cyclohexanol, benzyl alcohol, etc. The preferred materials because of their easier accessibility and freedom from side reactions are the N,N-dialkyldithiocarbamic esters of primary alcohols having no substituents other than the alcoholic hydroxyls. The best results as regards heat stabilization are obtained with bis N,N-dialkyldithiocarbamates of dihydric primary alcohols having no substituent other than the alcoholic hydroxyls. The most useful stabilizers are the N,N-dialkyldithiocarbamates, wherein the alkyl groups have from 1 to 12 carbon atoms, of polymethylene glycols having from 6 to 18 methylene groups between the alcoholic hydroxyls.

While as little as 0.1% of dithiocarbamate based on the weight of 2,3-dichloro-1,3-butadiene polymer is sufficient to impart heat-stabilizing effects, it is preferable to use at least 0.5% of the dithiocarbamate. Although the presence of the stabilizer in excess of that required is not particularly important, it is unnecessary and uneconomical to use more than 5% of the stabilizer, a generally useful proportion being between 1 and 3%, based on the weight of the polymer.

The dithiocarbamate may be incorporated into the polymer by any suitable method, such as by solution in a mutual solvent followed by removal of the solvent, or by intimate mixing of the solids on a rubber mill, or by mixing aqueous dispersions of the polymer and stabilizer. The dithiocarbamate may also be introduced into the polymerization system (bulk, solution, emulsion, etc. . . .) after the 2,3-dichloro-1,3-butadiene has polymerized to some extent.

The invention is particularly useful in the heat-stabilization of 2,3-dichloro-1,3-butadiene polymer in the form of shaped structures such as films, filaments, moldings and the like, with or without added materials such as plasticizers, pigments, antioxidants, reinforcing agents, etc.

As many apparently widely different embodiments of this invention may be made without departing from the spirit and scope thereof, it is to be understood that this invention is not limited to the specific embodiments thereof except as defined in the appended claims.

I claim:

1. A polymer of 2,3-dichloro-1,3-butadiene containing in minor amount, and in amount of at least 0.5% by weight thereof, an N,N-dialkyldithiocarbamate, in which the alkyl groups contain from 1 to 12 carbon atoms, of a polymethylene glycol having from 6 to 18 methylene groups between the alcoholic hydroxyls.

2. A polymer of 2,3-dichloro-1,3-butadiene containing in minor amount, and in amount of at least 0.1% by weight thereof, an N,N-dialkyldithiocarbamate, in which the alkyl groups contain from 1 to 12 carbon atoms, of a dihydric primary alcohol in which the sole substituent is the alcoholic hydroxyl.

3. A polymer of 2,3-dichloro-1,3-butadiene containing in minor amount, and in amount of at least 0.5% by weight thereof, 1,10-decamethylene bis dimethyldithiocarbamate.

4. A polymer of 2,3-dichloro-1,3-butadiene containing in minor amount, and in amount of at least 0.5% by weight thereof, 1,6-hexamethylene bis dimethyldithiocarbamate.

5. A polymer of 2,3-dichloro-1,3-butadiene containing in minor amount, and in amount of at least 0.5% by weight thereof, xylylene di-n-butyldithiocarbamate.

ARTHUR L. BARNEY.

REFERENCES CITED

The following references are of record in the file of this patent:

UNITED STATES PATENTS

| Number | Name | Date |
|---|---|---|
| 1,965,369 | Carothers | July 31, 1934 |
| 2,259,122 | Walker | Oct. 14, 1941 |
| 2,387,518 | Lightbown | Oct. 23, 1945 |
| 2,445,739 | Rowland | July 20, 1948 |

Certificate of Correction

Patent No. 2,516,945                                                        August 1, 1950

ARTHUR L. BARNEY

It is hereby certified that error appears in the printed specification of the above numbered patent requiring correction as follows:

Column 2, line 53, for "$(C_4H_9)$" read $(C_4H_9)_2$;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*